Figure 1:
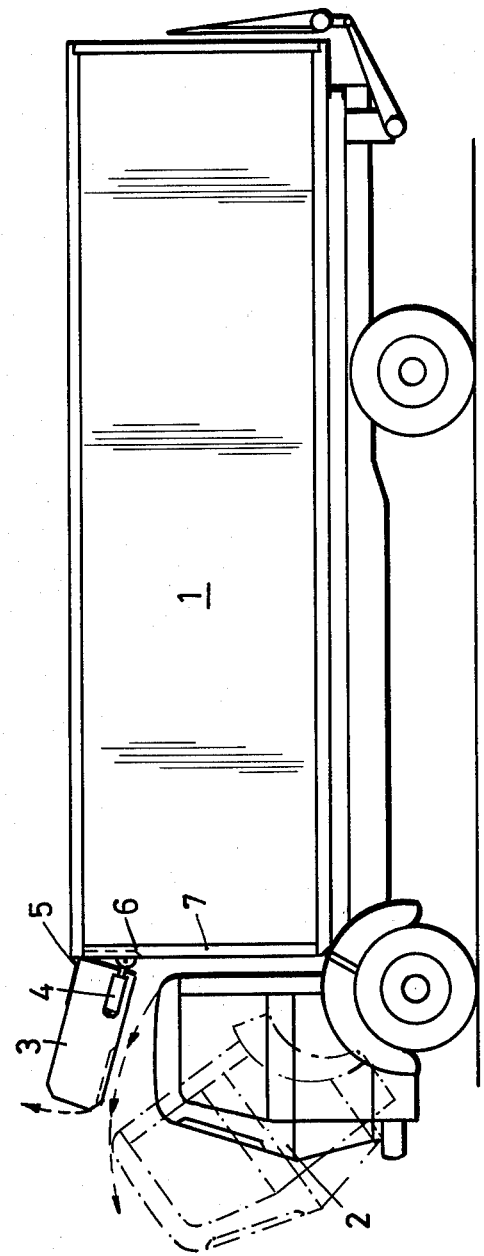

United States Patent [19]

Grosskopf

[11] 4,109,485
[45] Aug. 29, 1978

[54] REFRIGERATOR TRUCK INCLUDING A REFRIGERATING MACHINE IN UNIT CONSTRUCTION

[76] Inventor: Peter Volker Grosskopf, Am Ruhrstein 25a, 4300 Essen, Fed. Rep. of Germany

[21] Appl. No.: 754,227

[22] Filed: Dec. 27, 1976

[30] Foreign Application Priority Data

Dec. 27, 1975 [DE] Fed. Rep. of Germany ....... 2558822

[51] Int. Cl.² ...................... F25D 19/00; F25D 19/02
[52] U.S. Cl. ....................................... 62/298; 62/448; 180/89.14
[58] Field of Search ................. 62/298, 244, 448, 449, 62/239; 180/89.14

[56] References Cited

U.S. PATENT DOCUMENTS

| 2,263,476 | 11/1941 | Sunday | 62/448 |
| 2,433,655 | 12/1947 | Di Zoppola | 62/449 |
| 3,100,384 | 8/1963 | Lowensohn | 62/419 |
| 3,421,340 | 1/1969 | Von Berg | 62/449 |
| 3,819,225 | 6/1974 | Carlisle et al. | 180/89.14 |
| 3,884,048 | 5/1975 | Schneider | 62/298 |

*Primary Examiner*—Lloyd L. King
*Attorney, Agent, or Firm*—Fitch, Even, Tabin & Luedeka

[57] ABSTRACT

A refrigerator truck having a driver's cab adapted to be swung forwards includes a refrigeration unit located immediately above the cab and mounted for pivotal movement upwardly to allow the forward swing of the cab without removal of the refrigeration unit.

3 Claims, 2 Drawing Figures

REFRIGERATOR TRUCK INCLUDING A REFRIGERATING MACHINE IN UNIT CONSTRUCTION

The present invention relates to a refrigerator truck including a refrigerating machine in unit (block) construction (refrigerating unit), the refrigerating portion of which is fitted on an opening in the insulated body of the truck and which is mounted above a driver's cabin adapted to be swung forwards.

Refrigerator trucks of this type suffer from the disadvantage that the refrigerating machine must be mounted at so high a level that the driver's cabin, irrespective of the presence of the refrigerating machine, is still adapted to be swung forwards from under this machine. However, this has the consequence of the truck body becoming extremely high so as to frequently exceed the maximum permissible dimension, or an extremely high constructional expenditure is required in order to maintain a correspondingly low configuration of the cabin or to provide the refrigerating machine with a corresponding configuration.

Further, it is known that in the above-outlined combination the refrigerating machine as a whole is unscrewed for removal before the driver's cabin can be swung forwards. However, such removal can be carried out only with the aid of forklifts or other facilities, and since this greatly affects the performance of repair on the road, this expediency, thus, is obviously not suitable to be applied in practice.

Another possibility permitting the provision of a driver's cabin adapted to be swung free in forward direction resides in selecting an underfloor refrigerating system including a separate evaporator portion. However, it is of disadvantage in such construction that great constructional expenditure is require to this end and that, furthermore, the refrigerating machine and the condenser become corroded and contaminated to an extremely high degree.

Accordingly, it is an object of the present invention to provide a refrigerator truck or van including a refrigerating machine mounted above a pivotally mounted driver's cabin, which truck no longer shows the above-discussed drawbacks and which, in particular, provides for easy, quick, and ready swinging forward of the driver's cabin without requiring any extra expenditure, whereby the height of the truck body should be kept as low as possible and pivoting (swinging forward) of the driver's cabin should be possible even on the road and without any auxiliary aids. Furthermore, repair and inspection should thereby be facilitated by making accessible the side of the cabin confronting the body of the truck. According to the present invention, this object is solved in that said refrigerating machine is positioned directly above said driver's cabin and mounted for pivoting movement about its upper edge adjacent said body so as to permit said cabin to be tipped or swung forwards.

Pivoting or tipping can be effected in a particularly easy manner by means of pressurized fluid cylinders acting on both sides or on one side or centrally between the body and the refrigerating unit, or by means of a corresponding mechanism.

In order to facilitate operation of these hydraulic cylinders, the refrigerator truck according to the present invention preferably includes a hydraulic conduit extending from the hydraulic pump for pivoting the driver's cabin to the cylinders so as to feed said cylinders with the stream of pressurized fluid supplied by said hydraulic pump.

The pivoting or swinging-forward step as such may be facilitated by connecting the refrigerating unit to the truck body by means of a joint.

Figure 2:
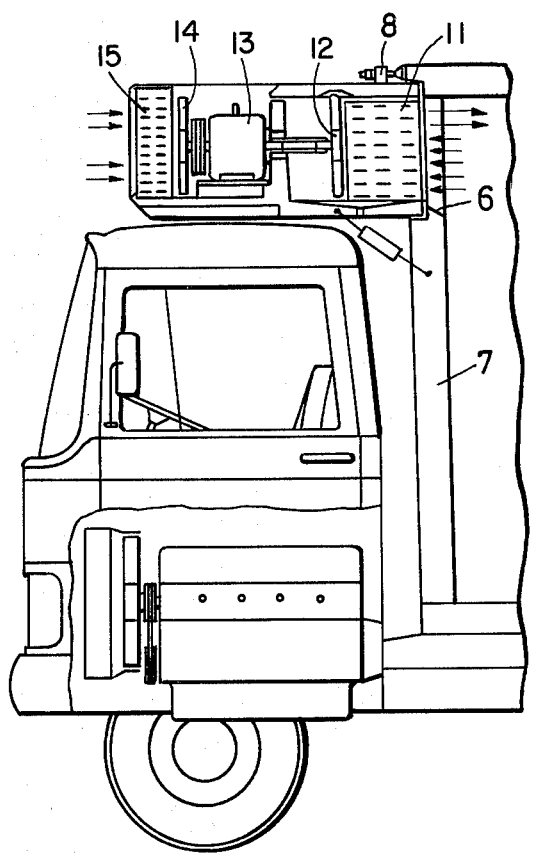

Below, an exemplary embodiment of the invention is explained in greater detail by referring to the enclosed drawings, wherein:

FIG. 1 is a schematical view of a refrigerator truck having a pivotally mounted driver's cabin according to the present invention; and FIG. 2 is a sectional view of a refrigerating unit or, block according to the present invention, on enlarged scale as compared to FIG. 1.

As shown in the Figures, the body 1 of the truck being formed as an insulated body, has in the upper portion of its front end wall 7 an opening to which a refrigerating machine 3 in unit construction or a refrigerating unit or block 3, respectively, is mounted. Immediately below this refrigerating block 3 and with a small spacing therefrom, the pivotally mounted driver's cabin 2 of the truck is situated.

The refrigerating unit 3 may be identical to the refrigerating units according to applicant's prior applications, such that a detailed explanation thereof may be omitted. Briefly, the refrigerating unit illustrated in FIG. 2 comprises an evaporator means 11 disposed closely adjacent to and slightly projecting into an opening in the truck means for delivering cold air shown by the arrows located adjacent the top of the evaporating means. Warm air from the truck body passes through the opening, as shown by the lower arrows, and flows into the evaporator means for cooling and for return. A fan 12 is associated with the evaporator means 11 and is driven by a motor means 13. A separate condenser means 15 for the refrigerating unit is also provided with a fan 14 for drawing ambient air through the condenser means 15. The fan 14 is driven by the motor means 13. At its side confronting the truck body, this unit is shaped in conformity to the opening in wall 7, and a peripheral seal or gasket 6 disposed within the opening and/or on the body-side end of unit 3 provides for sealing relative to the outer atmosphere. Hereby, unit 3 is fitted into a step of the opening extending towards the body 1, and the upper end of this unit is secured to the roof of the truck body by means of a clamping bolt 8. The clamping bolt 8 is articulated to body 1 through a pivot axis or swivel joint 5.

In the lower portion, one or two hydraulic or pneumatic cylinders 4 are mounted within the space between the body end wall 7 and the refrigerating unit 3 on both sides, on one side, or centrally of said unit. If fed with a suitable pressurized fluid, the cylinder or cylinders extend(s) its or their piston(s) so as to pivot the refrigerating unit upwards about the pivot axis or joint 5. As shown in FIG. 1, the cabin may then be swung forwards without being impeded by the refrigerating unit 3, although the latter, as explained above, is mounted directly above the driver's cabin.

The flow of pressurized fluid may be produced by the same hydraulic hand pump which is also used to lift the driver's cabin. This pump may be used also to feed the pivot cylinders of the refrigerating unit. The advantages of this assembly reside in the fact that components of identical construction may be used for the tipping mechanism both of the cabin and of the refrigerating unit, whereby stocking and procurement of spare parts are simplified and such spare parts may be kept in stock in every truck repair shop. Surprising to the expert is that a sufficiently sound sealing is obtained upon lowering of the refrigerating unit 3, because the center of gravity of this unit is well in front of the pivot axis 5 (joint) 5 and an adequate sealing force is provided by gravity in this way. Accordingly, additional latch or lock means are not required, and operation or servicing of the refrigerating unit 3 must be considered to be possible in the most simple way conceivable. Likewise, the refrigerating unit 3 may be lifted by a forklift in extremely easy manner upon untightening of the clamping bolt 8 which is secured to the body of the truck by means of a (swivel) joint 5 such that swinging upwards of the refrigerating unit is rendered possible even without untightening of the clamping bolt(s).

Considered on the whole, the present invention thus provides for a surprisingly simple and efficient solution to the existing problems.

What is claimed is:

1. A refrigerator truck comprising an insulated truck body,
 a driver's cabin mounted forwardly of said truck body and adjacent thereto, said cabin being pivotally mounted for swinging about its forward lower end thereby raising the rearward upward end of said cabin,
 a refrigerating machine positioned directly above said driver's cabin, said cabin being immediately and directly below said refrigerating machine,
 means mounting said refrigerating machine to said truck for pivoting said refrigerating machine about an upper rear edge of said refrigerating machine,
 said pivotally mounted refrigerating machine including a condenser means, an evaporator means and a motor means and being pivotable therewith,
 said truck body having an opening therein for receiving cooled air from said evaporator means, said evaporator means being positioned outside of said truck body and in a position to be free to pivot upwardly relative to said truck body,
 said refrigerating machine having a discharge into an air inlet leading into said truck body and means for pivoting said refrigerator machine upwardly sufficiently to allow said driver's cabin to pivot forwardly.

2. The refrigerator truck in accordance with claim 1 in which said means for pivoting said refrigerating machine upwardly comprises fluid cylinder means acting between said truck body and said refrigerating machine.

3. The refrigerator truck of claim 2 in which a hydraulic conduit extends from said fluid cylinder means to a hydraulic pump used to pivot said truck cabin.

* * * * *